(12) United States Patent
Olszewski

(10) Patent No.: US 8,270,435 B2
(45) Date of Patent: Sep. 18, 2012

(54) METHOD AND SYSTEM FOR VARIABLE-SIZED RESOURCE BLOCK ALLOCATION WITHIN OFDMA COMMUNICATION SYSTEMS

(75) Inventor: Kim Olszewski, San Diego, CA (US)

(73) Assignee: ZTE (USA) Inc., San Diego, CA (US)

( * ) Notice: Subject to any disclaimer, the term of this patent is extended or adjusted under 35 U.S.C. 154(b) by 658 days.

(21) Appl. No.: 12/401,568

(22) Filed: Mar. 10, 2009

(65) Prior Publication Data
US 2009/0262692 A1 Oct. 22, 2009

Related U.S. Application Data

(60) Provisional application No. 61/035,351, filed on Mar. 10, 2008.

(51) Int. Cl.
*H04J 3/16* (2006.01)
*H04J 11/00* (2006.01)
*H04L 12/28* (2006.01)

(52) U.S. Cl. ............... 370/468; 370/395.4; 370/208

(58) Field of Classification Search ............ 370/468, 370/395.21, 395.4, 203, 208, 209, 210, 329, 370/472, 473, 431, 436, 341, 432, 437, 328, 370/337, 335; 455/450, 451, 452.2, 524, 455/525, 509, 512, 513
See application file for complete search history.

(56) References Cited

U.S. PATENT DOCUMENTS

| | | | |
|---|---|---|---|
| 7,016,319 B2 * | 3/2006 | Baum et al. | 370/329 |
| 2008/0232240 A1 * | 9/2008 | Baum et al. | 370/210 |

* cited by examiner

*Primary Examiner* — Hanh Nguyen
(74) *Attorney, Agent, or Firm* — Duane Morris LLP; Richard C. Kim

(57) ABSTRACT

A system for variable-sized resource block allocation in a communication system is disclosed. A processor module is configured to construct one or more resource blocks, having one or more sizes, and to define a candidate resource block set, including one or more of the constructed resource blocks, and a coherence bandwidth set, including one or more coherence bandwidths. A coherence bandwidth estimate is derived for a resource block subframe, and the one or more resource blocks in the resource block set are ranked, based on a comparison between the coherence bandwidth estimate and each of the one or more coherence bandwidths in the coherence bandwidth set. The highest ranked resource block is allocated for a data transmission to a user; and data is scheduled in accordance with a size of the allocated resource block. The allocated resource block size is indicated to one or more mobile stations in the communication system.

45 Claims, 6 Drawing Sheets

METHOD AND SYSTEM FOR VARIABLE-SIZED RESOURCE BLOCK ALLOCATION WITHIN OFDMA COMMUNICATION SYSTEMS

CROSS-REFERENCE TO RELATED APPLICATIONS

This application claims priority to U.S. Provisional Patent Application No. 61/035,351 filed on Mar. 10, 2008, entitled "Method for Variable-Sized Resource Block Allocation within OFDMA Communication Systems", the contents of which are incorporated by reference herein in their entirety.

FIELD OF THE INVENTION

The present invention relates generally to resource allocation in wireless communication systems, and more particularly to variable-sized resource block allocation Orthogonal Frequency Division Multiple Access (OFDMA) communication systems.

BACKGROUND

Spectral efficiency and data throughput are key requirements that a scheduler needs to address within an 802.16m system implementation. To maximize spectral efficiency and data throughput a base station (BS) scheduler must optimally allocate OFDMA subcarriers or subchannels to users within its cell. Assuming $N_{FFT}$ denotes an IFFT/FFT length and $N_{used} < N_{FFT}$ the number of used subcarriers, $S_{N_{used}}$ denotes a set that contains the integer-valued subcarrier indices of the $N_{used}$ subcarriers, and the integer-valued variable $1 \leq n_{Users} \leq N_{used}$ denotes the number of users to be serviced by the nth DL or UL subframe, for $n_{Users}$ users a scheduler specified subcarrier allocation for the nth subframe may be denoted as:

$$A[n] = \{A_0[n], A_1[n], \ldots, A_{n_{Users}-1}[n]\}. \quad (1)$$

Allocation set A[n] contains distinct subcarrier subsets $A_0[n]$, $A_1[n], \ldots, A_{n_{Users}-1}[n]$ which are disjoint subsets of $S_{N_{used}}$. The ith subcarrier subset $A_i[n]$ consists of $N_i$ subcarriers. Depending on channel conditions, subcarriers within each $A_i[n]$ may be contiguous or non-contiguous. If all $N_{used}$ subcarriers are used the equality:

$$N_0 + N_1 + \ldots + N_{n_{Users}-1} = N_{used} \quad (2)$$

must be true for a specified allocation A[n].
In general, the BS may specify a subcarrier allocation A[n] by deterministically or pseudo-randomly permuting the elements of the subcarrier set $S_{N_{used}}$ and then partitioning the resulting permutation set into subcarrier subsets $A_i[n]$, $i=0$, $1, \ldots, n_{Users}-1$. For example, the elements in set $S_{16} = \{0, 1, 2, \ldots, 15\}$ may be pseudo-randomly permuted giving the permuted set:

$$S_{16}^{Perm} = \{0,5,7,9,10,12,14,2,3,4,11,13,6,8,15\} \quad (3)$$

This set can then be partitioned to produce the subcarrier subsets:

$$A_0[n] = \{0,5\}$$

$$A_1[n] = \{7,9,10,12,14\}$$

$$A_2[n] = \{2,3,4,11,13\}$$

$$A_3[n] = \{6,8,15\} \quad (4)$$

The multinomial coefficient:

$$C(N_0, N_1, \ldots, N_{n_{Users}-1}) = \frac{N_{used}!}{N_0! N_1! \ldots N_{n_{Users}-1}!} \quad (5)$$

equals the number of ways the scheduler may allocate $N_{used}$ subcarriers to $n_{Users}$ users with $N_0$ subcarriers in the first subset $A_0[n]$, $N_1$ subcarriers in the second subset $A_1[n]$, and so on. It is clear that finding an optimal allocation from all possible $C(N_0, N_1, \ldots, N_{n_{Users}-1})$ subcarriers combinations is not a practical task for a BS scheduler. For example, the multinomial coefficient for the simple example above is:

$$C(N_0, N_1, N_2, N_3) = \frac{16!}{2!5!5!3!} = 7.2649 \times 10^9 \quad (6)$$

Indeed, the problem of multi-user subcarrier/subchannel allocation by a BS can be computationally complex and time consuming, especially when the number of subcarrier/subchannel is large. In addition, the amount of overhead for signaling subcarrier/subchannel allocations and uplink channel quality reporting for user may substantially degrade spectral efficiency gains associated with multi-user diversity. Implementation difficulties may also arise. For example, a receiving BS will need to support numerous frequency offsets and dynamic ranges. Thus, an improved physical layer resource unit is required to simplify a BS's scheduling task and to help minimize associated overhead and signaling.

SUMMARY OF THE INVENTION

The presently disclosed embodiments are directed to solving one or more of the problems presented in the prior art, described above, as well as providing additional features that will become readily apparent by reference to the following detailed description when taken in conjunction with the accompanying drawings.

In the following description, embodiments of the invention are disclosed that support numerous channel bandwidths defined in the 802.16m Requirements Document and the numerous radio environments and associated channel conditions defined in the 802.16m Evaluation Methodology Document. The features of resource block (RB) construction, proposed RB sizes that support the 802.16m operating channels, RB allocation modes that better support the various 802.16m channel conditions, and adapting RB bandwidth to better support the numerous channels conditions are described herein.

One embodiment of the present invention is directed to a method for variable-sized resource block allocation in a communication system. The method comprises constructing one or more resource blocks, having one or more sizes, and defining a candidate resource block set, including one or more of the constructed resource blocks, and a coherence bandwidth set, including one or more coherence bandwidths. A coherence bandwidth estimate is derived for a resource block subframe; and the one or more resource blocks in the resource block set are ranked, based on a comparison between the coherence bandwidth estimate and each of the one or more coherence bandwidths in the coherence bandwidth set. The highest ranked resource block is allocated for a data transmission to a user; and data is scheduled in accordance with a size of the allocated resource block.

Another embodiment is directed to a system for variable-sized resource block allocation in a communication system. The system includes a processor module configured to construct one or more resource blocks, having one or more sizes, and to define a candidate resource block set, including one or more of the constructed resource blocks, and a coherence bandwidth set, including one or more coherence bandwidths; a coherence bandwidth module configured to derive a coherence bandwidth estimate for a resource block subframe; a comparing module configured to rank the one or more resource blocks in the resource block set, based on a comparison between the coherence bandwidth estimate and each of the one or more coherence bandwidths in the coherence bandwidth set; an allocating module configured to allocate a highest ranked resource block for a data transmission to a user; and a scheduler configured to schedule data in accordance with a size of the allocated resource block.

Yet another embodiment is directed to a station configured for variable-sized resource block allocation in a communication system. The station includes means for constructing one or more resource blocks, having one or more sizes; means for defining a candidate resource block set, including one or more of the constructed resource blocks, and a coherence bandwidth set, including one or more coherence bandwidths; means for deriving a coherence bandwidth estimate for a resource block subframe; means for ranking the one or more resource blocks in the resource block set, based on a comparison between the coherence bandwidth estimate and each of the one or more coherence bandwidths in the coherence bandwidth set; means for allocating a highest ranked resource block for a data transmission to a user; and means for scheduling data in accordance with a size of the allocated resource block. According to certain embodiments, the station is a base station in a wireless communication system.

Yet another embodiment is directed to a computer-readable medium storing instructions thereon for performing a method for variable-sized resource block allocation in a communication system. The method includes constructing one or more resource blocks, having one or more sizes; defining a candidate resource block set, including one or more of the constructed resource blocks, and a coherence bandwidth set, including one or more coherence bandwidths; deriving a coherence bandwidth estimate for a resource block subframe; ranking the one or more resource blocks in the resource block set, based on a comparison between the coherence bandwidth estimate and each of the one or more coherence bandwidths in the coherence bandwidth set; allocating a highest ranked resource block for a data transmission to a user; and scheduling data in accordance with a size of the allocated resource block.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
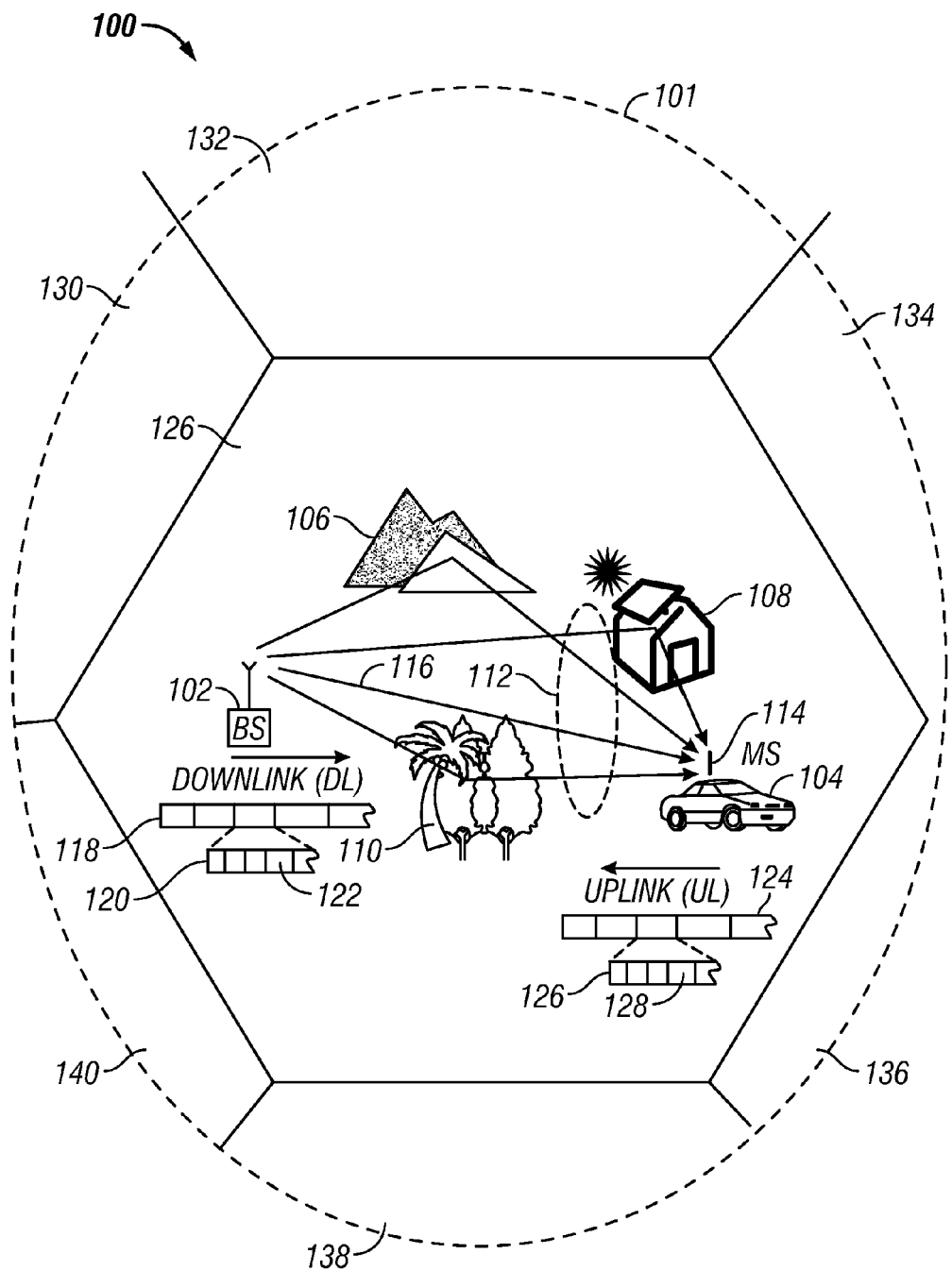
FIG. 1 is an illustration of an exemplary OFDM/OFDMA mobile radio channel operating environment, according to an embodiment.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein describe a wireless cellular communication system where the transmission direction from a base station to mobile station is called downlink, while the opposite direction is called uplink. On both downlink and uplink, the radio signal transmissions over the time are divided into periodic frames (or subframes, slots, etc). Each radio frame contains multiple time symbols that include data symbols (DS) and reference symbols (RS). Data symbols carry the data information, while the reference symbols are known at both transmitter and receiver, and are used for channel estimation purposes. Note that the functions described in the present disclosure may be performed by either a base station or a mobile station. A mobile station may be any user device such as a mobile phone, and a mobile station may also be referred to as user equipment (UE).

Aspects of the present disclosure are directed toward systems and methods for OFDM/OFDMA frame structure technology for communication systems. Embodiments of the invention are described herein in the context of one practical application, namely, communication between a base station and a plurality of mobile devices. In this context, the exemplary system is applicable to provide data communications between a base station and a plurality of mobile devices. Embodiments of the disclosure, however, are not limited to such base station and mobile device communication applications, and the methods described herein may also be utilized in other applications such as mobile-to-mobile communications, or wireless local loop communications. As would be apparent to one of ordinary skill in the art after reading this description, these are merely examples and the invention is not limited to operating in accordance with these examples. Assignment of resources within a frame to the data being carried can be applied to any digital communications system with data transmissions organized within a frame structure and where the full set of such resources within a frame can be flexibly divided according to portions of different sizes to the data being carried. Thus, the present disclosure is not limited to any particular type of communication system; however, embodiments of the present invention are described herein with respect to exemplary OFDM/OFDMA systems.

As explained in additional detail below, the Orthogonal Frequency Division Multiplexing (OFDM)/OFDMA frame structure comprises a variable length sub-frame structure with an efficiently sized cyclic prefix operable to effectively utilize OFDM/OFDMA bandwidth. The frame structure provides compatibility with multiple wireless communication systems.

FIG. 1 illustrates a mobile radio channel operating environment 100, according to one embodiment of the present invention. The mobile radio channel operating environment 100 may include a base station (BS) 102, a mobile station (MS) 104, various obstacles 106/108/110, and a cluster of notional hexagonal cells 126/130/132/134/136/138/140 overlaying a geographical area 101. Each cell 126/130/132/134/136/138/140 may include a base station operating at its allocated bandwidth to provide adequate radio coverage to its intended users. For example, the base station 102 may operate at an allocated channel transmission bandwidth to provide adequate coverage to the mobile station 104. The exemplary mobile station 104 in FIG. 1 is an automobile; however mobile station 104 may be any user device such as a mobile phone. Alternately, mobile station 104 may be a personal digital assistant (PDA) such as a Blackberry device, MP3 player or other similar portable device. According to some embodiments, mobile station 104 may be a personal wireless computer such as a wireless notebook computer, a wireless palmtop computer, or other mobile computer devices.

The base station 102 and the mobile station 104 may communicate via a downlink radio frame 118, and an uplink radio frame 124 respectively. Each radio frame 118/124 may be further divided into sub-frames 120/126 which may include data symbols 122/124. In this mobile radio channel operating environment 100, a signal transmitted from a base station 102 may suffer from the operating conditions mentioned above. For example, multipath signal components 112 may occur as a consequence of reflections, scattering, and diffraction of the transmitted signal by natural and/or man-made objects 106/108/110. At the receiver antenna 114, a multitude of signals may arrive from many different directions with different delays, attenuations, and phases. Generally, the time difference between the arrival moment of the first received multipath component 116 (typically the line of sight component), and the last received multipath component (possibly any of the multipath signal components 112) is called delay spread. The combination of signals with various delays, attenuations, and phases may create distortions such as ISI and ICI in the received signal. The distortion may complicate reception and conversion of the received signal into useful information. For example, delay spread may cause ISI in the useful information (data symbols) contained in the radio frame 124.

OFDM can mitigate delay spread and many other difficult operating conditions. OFDM divides an allocated radio communication channel into a number of orthogonal subchannels of equal bandwidth. Each subchannel is modulated by a unique group of subcarrier signals, whose frequencies are equally and minimally spaced for optimal bandwidth efficiency. The group of subcarrier signals are chosen to be orthogonal, meaning the inner product of any two of the subcarriers equals zero. In this manner, the entire bandwidth allocated to the system is divided into orthogonal subcarriers. OFDMA is a multi-user version of OFDM. For a communication device such as the base station 102, multiple access is accomplished by assigning subsets of orthogonal sub-carriers to individual subscriber devices. A subscriber device may be a mobile station 104 with which the base station 102 is communicating.

Figure 2:
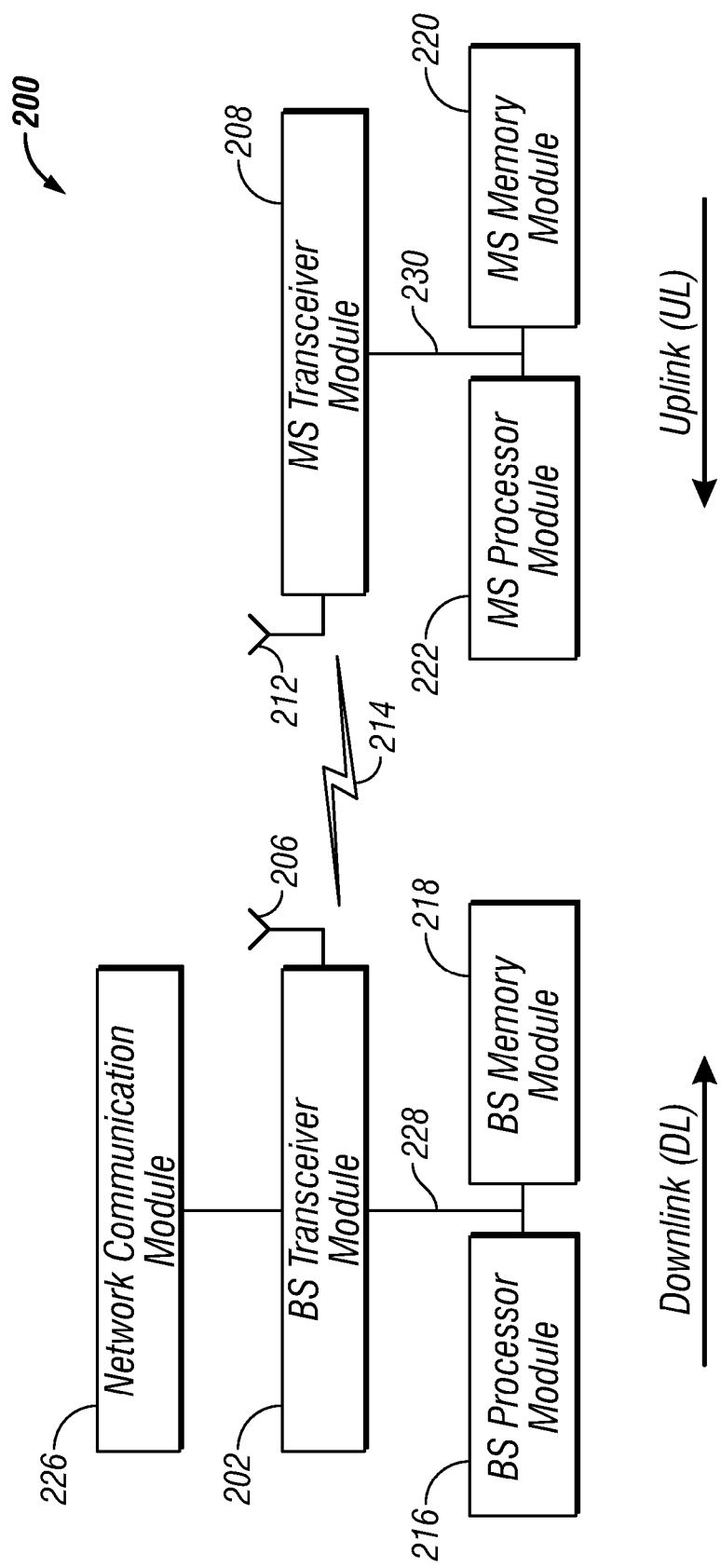
FIG. 2 is an illustration of an exemplary OFDM/OFDMA exemplary communication system according to an embodiment.

FIG. 2 shows an exemplary wireless communication system 200 for transmitting and receiving OFDM/OFDMA transmissions, in accordance with one embodiment of the present invention. The system 200 may include components and elements configured to support known or conventional operating features that need not be described in detail herein. In the exemplary embodiment, system 200 can be used to transmit and receive OFDM/OFDMA data symbols in a wireless communication environment such as the wireless communication environment 100 (FIG. 1). System 200 generally comprises a base station 102 with a base station transceiver module 202, a base station antenna 206, a base station processor module 216 and a base station memory module 218. System 200 generally comprises a mobile station 104 with a mobile station transceiver module 208, a mobile station antenna 212, a mobile station memory module 220, a mobile station processor module 222, and a network communication module 226. Of course both BS 102 and MS 104 may include additional or alternative modules without departing from the scope of the present invention.

Furthermore, these and other elements of system 200 may be interconnected together using a data communication bus (e.g., 228, 230), or any suitable interconnection arrangement. Such interconnection facilitates communication between the various elements of wireless system 200. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary OFDM/OFDMA system 200, the base station transceiver 202 and the mobile station transceiver 208 each comprise a transmitter module and a receiver module (not shown). Additionally, although not shown in this figure, those skilled in the art will recognize that a transmitter may transmit to more than one receiver, and that multiple transmitters may transmit to the same receiver. In a TDD system, transmit and receive timing gaps exist as guard bands to protect against transitions from transmit to receive and vice versa.

In the particular example of the OFDM/OFDMA system depicted in FIG. 2, an "uplink" transceiver 208 includes an OFDM/OFDMA transmitter that shares an antenna with an uplink receiver. A duplex switch may alternatively couple the uplink transmitter or receiver to the uplink antenna in time duplex fashion. Similarly, a "downlink" transceiver 202 includes an OFDM/OFDMA receiver which shares a downlink antenna with a downlink transmitter. A downlink duplex switch may alternatively couple the downlink transmitter or receiver to the downlink antenna in time duplex fashion.

Although many OFDM/OFDMA systems will use OFDM/OFDMA technology in both directions, those skilled in the art will recognize that the present embodiments of the invention are applicable to systems using OFDM/OFDMA technology in only one direction, with an alternative transmission technology (or even radio silence) in the opposite direction. Furthermore, it should be understood by a person of ordinary skill in the art that the OFDM/OFDMA transceiver modules 202/208 may utilize other communication techniques such as, without limitation, a frequency division duplex (FDD) communication technique.

The mobile station transceiver 208 and the base station transceiver 202 are configured to communicate via a wireless data communication link 214. The mobile station transceiver 208 and the base station transceiver 202 cooperate with a suitably configured RF antenna arrangement 206/212 that can support a particular wireless communication protocol and modulation scheme. In the exemplary embodiment, the mobile station transceiver 208 and the base station transceiver 202 are configured to support industry standards such as the Third Generation Partnership Project Long Term Evolution (3GPP LTE), Third Generation Partnership Project 2 Ultra Mobile Broadband (3 Gpp2 UMB), Time Division-Synchronous Code Division Multiple Access (TD-SCDMA), and Wireless Interoperability for Microwave Access (WiMAX), and the like. The mobile station transceiver 208 and the base station transceiver 202 may be configured to support alternate, or additional, wireless data communication protocols, including future variations of IEEE 802.16, such as 802.16e, 802.16m, and so on.

According to certain embodiments, the base station 102 controls the radio resource allocations and assignments, and the mobile station 104 is configured to decode and interpret the allocation protocol. For example, such embodiments may be employed in systems where multiple mobile stations 104 share the same radio channel which is controlled by one base station 102. However, in alternative embodiments, the mobile station 104 controls allocation of radio resources for a particular link, and could implement the role of radio resource controller or allocator, as described herein.

Processor modules 216/222 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor modules 216/222 comprise processing logic that is configured to carry out the functions, techniques, and processing tasks associated with the operation of OFDM/OFDMA system 200. In particular, the processing logic is configured to support the OFDM/OFDMA frame structure parameters described herein. In practical embodiments the processing logic may be resident in the base station and/or may be part of a network architecture that communicates with the base station transceiver 202.

The steps of a method or algorithm described in connection with the embodiments disclosed herein may be embodied directly in hardware, in firmware, in a software module executed by processor modules 216/222, or in any practical combination thereof. A software module may reside in memory modules 218/220, which may be realized as RAM memory, flash memory, ROM memory, EPROM memory, EEPROM memory, registers, a hard disk, a removable disk, a CD-ROM, or any other form of storage medium known in the art. In this regard, memory modules 218/220 may be coupled to the processor modules 218/222 respectively such that the processors modules 216/220 can read information from, and write information to, memory modules 618/620. As an example, processor module 216, and memory modules 218, processor module 222, and memory module 220 may reside in their respective ASICs. The memory modules 218/220 may also be integrated into the processor modules 216/220. In an embodiment, the memory module 218/220 may include a cache memory for storing temporary variables or other intermediate information during execution of instructions to be executed by processor modules 216/222. Memory modules 218/220 may also include non-volatile memory for storing instructions to be executed by the processor modules 216/220.

Memory modules 218/220 may include a frame structure database (not shown) in accordance with an exemplary embodiment of the invention. Frame structure parameter databases may be configured to store, maintain, and provide data as needed to support the functionality of system 200 in the manner described below. Moreover, a frame structure database may be a local database coupled to the processors 216/222, or may be a remote database, for example, a central network database, and the like. A frame structure database may be configured to maintain, without limitation, frame structure parameters as explained below. In this manner, a frame structure database may include a lookup table for purposes of storing frame structure parameters.

The network communication module 226 generally represents the hardware, software, firmware, processing logic, and/or other components of system 200 that enable bi-directional communication between base station transceiver 202, and network components to which the base station transceiver 202 is connected. For example, network communication module 226 may be configured to support internet or WiMAX traffic. In a typical deployment, without limitation, network communication module 226 provides an 802.3 Ethernet interface such that base station transceiver 202 can communicate with a conventional Ethernet based computer network. In this manner, the network communication module 226 may include a physical interface for connection to the computer network (e.g., Mobile Switching Center (MSC)).

In accordance with embodiments described herein, time-frequency allocation units are referred to as Resource Blocks (RBs). A Resource Block (RB) is defined as a fixed-size rectangular area within a subframe comprised of a specified number of subcarriers (frequencies) and a specified number of OFDMA symbols (time slots). An RB is the smallest fundamental time-frequency unit that may be allocated to an 802.16m user.

Figure 3:
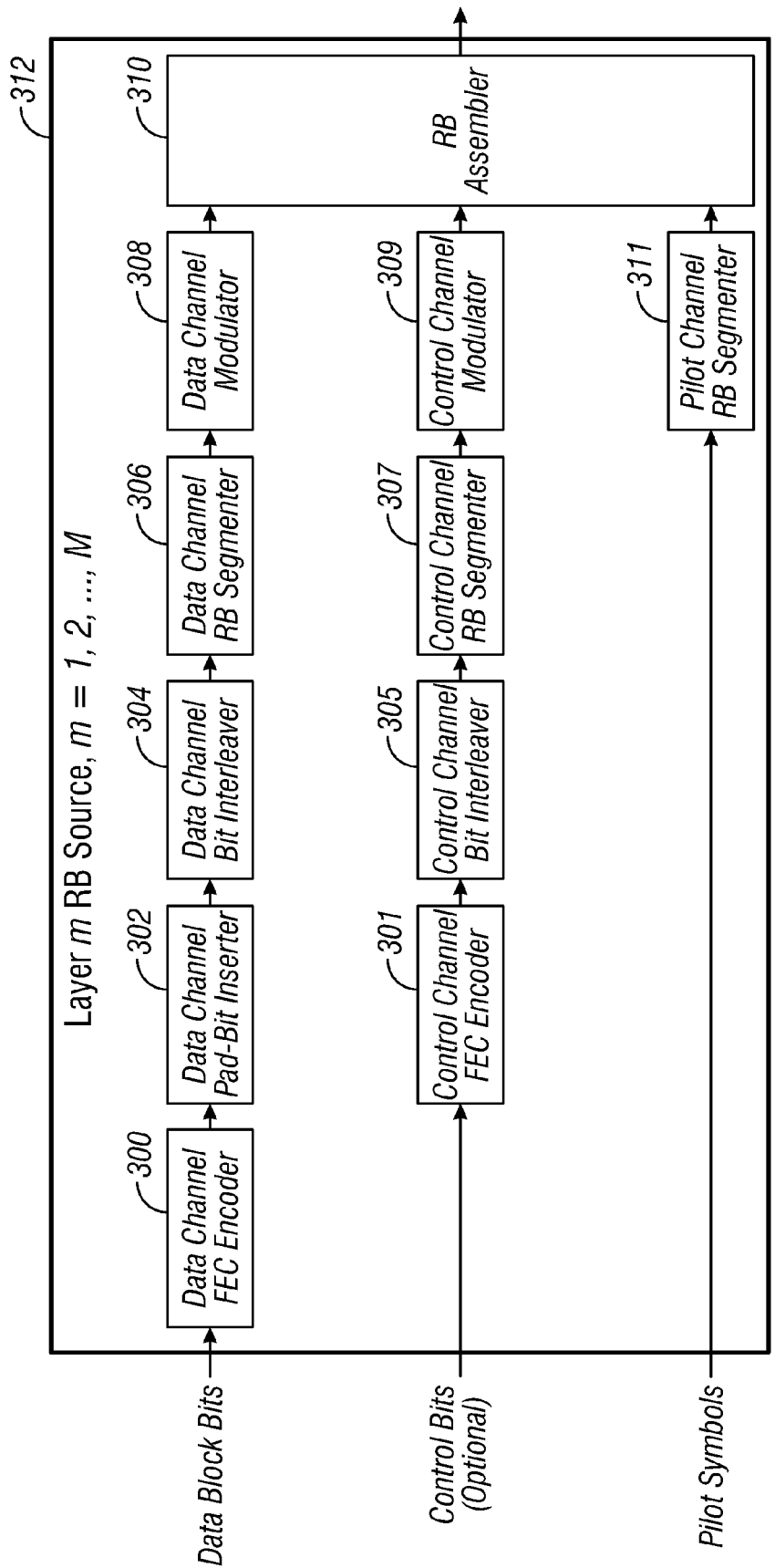
FIG. 3 is a conceptual block diagram of an OFDMA subsystem for mapping user data streams to resource blocks that comprise a downlink subframe, according to an embodiment.

FIG. 3 shows a conceptual block diagram an OFDMA subsystem 312 for mapping user data streams to RBs that comprise a downlink (DL) subframe. M layer RB sources may be spatially mapped to N data streams (where M may or may not equal N) before being transmitted at an RF front end (not shown). According to certain embodiments, each constructed downlink RB is comprised of Data Channel symbols and Pilot Channel symbols. However, various other symbols may be included. As an option, an RB may also contain Dedicated Control Channel symbols, for example, to minimize feedback delay. The OFDMA subsystem 312 for mapping data streams to RBs may be incorporated or otherwise communicatively coupled to base station 102, for example, as part of the BS processor module 216, for example. OFDMA subsystem 312 shows an exemplary layer m RB source (m=1, 2, . . . , M) for an exemplary data stream.

In FIG. 3, the approach for link adaptation is to adapt the M-QAM modulation of each user's RBs within a subframe, at a fixed code rate R. According to an embodiment, the code rate R may only be changed for each subframe, but modulation can be different for each subframe and each user RB within a subframe. Encoded blocks of equal code rate R may then be mapped onto several RBs where modulation is matched to channel conditions. This approach for link adaptation is motivated by the following: subcarrier channel variation associated with RBs belonging to the same user is typically much lower than the variation between different users; the codeword length can be large in order to make best use of DBTC or LDPC codes; and/or by employing one decoder for all user RBs, the decoding complexity is moderate. Various other motivations may be considered without departing from the scope of the present disclosure.

Figure 4:
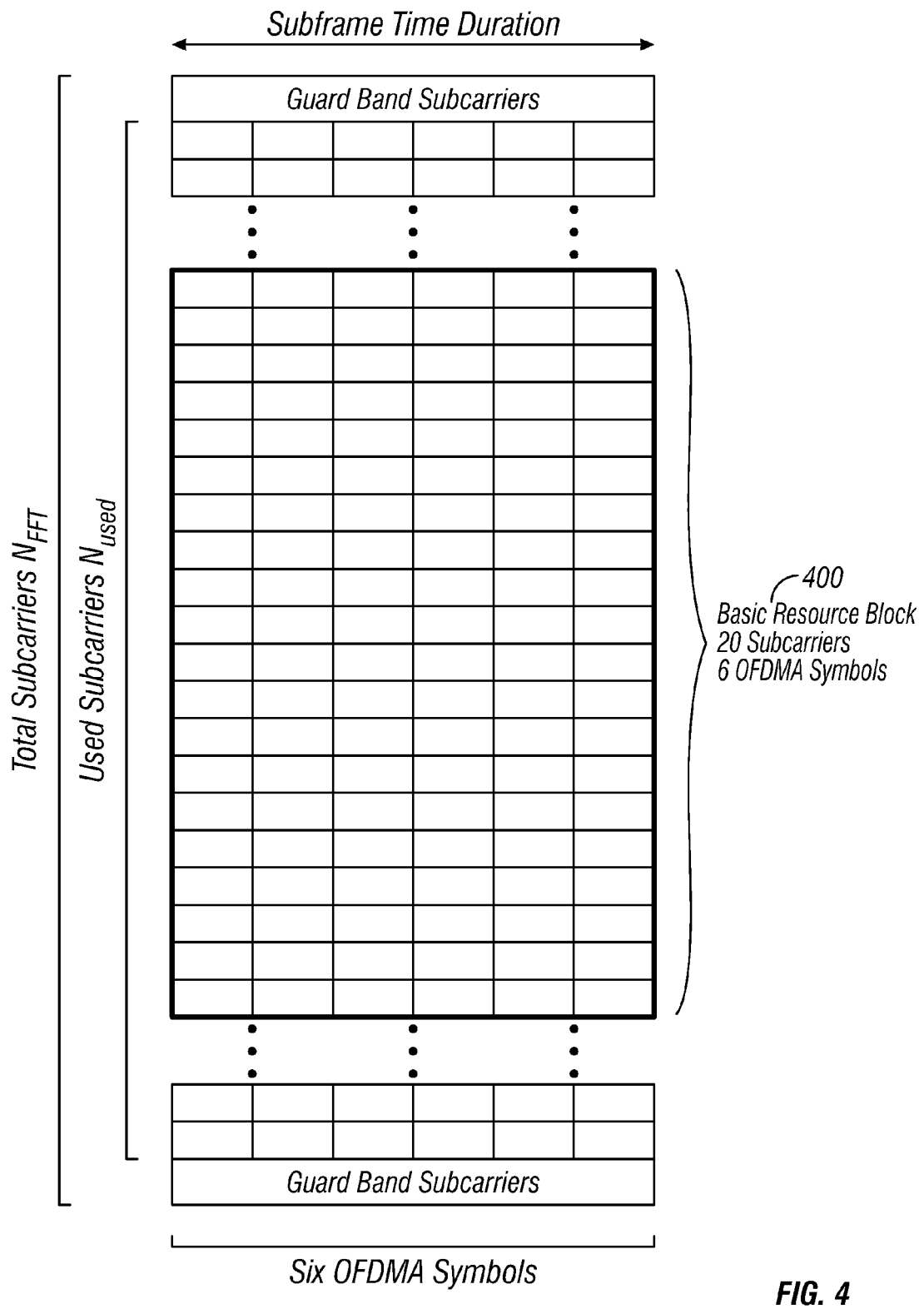
FIG. 4 is an illustration of a resource block construction, according to an embodiment.

The operations performed for RB construction are described below in further detail below with respect to FIGS. 3 and 4. For each subframe a BS scheduler (not shown), as part of BS processor module 216, may allocate a set of $n_B \geq 1$ fixed-sized RBs 400 for a user at a mobile station 104. The fixed-sized RBs 400 are parameterized by their heights $n_{sc}^{RB}$ and their widths $N_{sym}^{RB}$ (these dimensions are defined in greater detail below). RB 400 heights are in units of OFDMA subcarriers and RB 400 widths in units of OFDMA symbols. A user's $n_B$ RBs 400 may be located anywhere within a subframe's time-frequency plane. The area of an RB 400 is $n_{sc}^{RB} \times N_{sym}^{RB}$; this area also equals the number of M-QAM modulation symbols within an RB 400.

In accordance with the 802.16m traffic models, a data channel source produces randomized binary-valued data blocks of various lengths $\kappa_{Data}$. For example, a data channel source may produce a length $\kappa_{Data}$ data block by buffering $n_p$ randomized data packets of $n_{pbits}$ bits into a length $\kappa_{Data} = n_p n_{pbits}$ data block.

The Data Channel FEC Encoder 300 is parameterized by the pair $(\eta_{Data}, \kappa_{Data})$ where $\kappa_{Data}$ denotes the number of bits of an encoder input data block and $\eta_{Data}$ the number of encoded bits output by the encoder. Values for $\eta_{Data}$ must be divisors of two. Some exemplary code options for the encoder are Convolutional Codes, Duo-Binary Turbo-Codes (also called convolutional turbo codes) and Low Density Parity Check codes. The code and/or code rate $R_{Data} = \kappa_{Data}/\eta_{Data}$ of the Data Channel FEC Encoder 300 may be adapted to channel and interference conditions.

Each encoded length $\eta_{Data}$ data block output by the Data Channel FEC Encoder 300 is first interleaved by the Data Channel Bit Interleaver 304 and then input to the Data Channel RB Segmenter 306 where it is segmented into $n_B \geq 1$ encoded data sub-blocks of lengths $\eta_{k,Data}$, k=0, . . . , $n_B$-1. Lengths $\eta_{k,Data}$ must be divisors of two; they are specified by the scheduler and are based on the chosen RB 400 size.

The $n_B$ encoded data sub-blocks output by the Data Channel RB Segmenter 306 are then sequentially input to the M-QAM Data Channel Modulator 308. For the kth encoded data sub-block the modulator outputs a modulation symbol vector of length $m_{k,Data} = \eta_{k,Data}/b_{k,Data}$ where $b_{k,Data} = \log_2(M_{k,Data})$ denotes the number of bits per $M_{k,Data}$-QAM modulation symbol. Modulation symbols may be from an $M_{k,Data}=4$ (QPSK), an $M_{k,Data}=16$ (16-QAM) or an $M_{k,Data}=64$ (64-QAM) signal constellation, for example. However, various other modulation symbols may be used without departing from the scope of the present disclosure. It can be seen that the length $m_{k,Data}$ of a modulation symbol vector is dependent on the pair $(\eta_{k,Data}, b_{k,Data})$ k=0, . . . , $n_B$-1. For example, if $\eta_{k,Data}=640$, and $m_{k,Data}=2$ the length of the resulting modulation symbol vector is $m_{k,Data} = \eta_{k,Data}/b_{k,Data} = 320$. In current 802.16 systems, $\eta_{k,Data}$ and $b_{k,Data}$ are specified so that $m_{k,Data}$ is always a divisor of two. It is assumed that this is also true for 802.16m systems. For the kth modulation symbol vector all $m_{k,Data}$ data modulation symbols must be from the same signal constellation. However, they may be different for each of the $n_B$ data RB 400 blocks in order to adapt to time-varying channel and interference conditions. Signal constellations are specified by the BS scheduler and are based on channel and interference conditions.

For a specified code rate $R_{Data}$ and set of data M-QAM modulations $M_{k,Data}$, k=0, . . . , $n_B$-1, the total number of encoded data channel bits to be mapped by the BS scheduler to all $n_B$ allocated user RBs 400 is:

$$n_{Data\_bits} = \sum_{k=0}^{n_B-1} \frac{\eta_{k,Data}}{m_{k,Data}} \quad (7)$$

For each RB 400, the Pilot Symbols produce (after input to the Pilot Channel RB Segmenter 311) $n_{k,Pilot}$, k=0, . . . , $n_B$-1, pilot bits, two bits per complex-valued pilot symbol. The RB Assembler 310 combines the complex-valued pilot symbols within the complex-valued modulation symbol vectors output by the Data Channel Modulator 308. Pilot symbol sequences are generally chosen to have flat power spectral densities and constant envelopes.

The total number of encoded data channel bits plus pilot channel bits mapped by the Bs scheduler to all $n_B$ allocated user RBs 400 is:

$$n_{total\_user\_bits} = n_{Data\_bits} + \sum_{k=0}^{n_B-1} n_{k,Pilot} \quad (8)$$

It is noted that integer $n_{total\_user\_bits}$ is a variable that may not equal or match the total number of encoded data bits that can be transmitted by all $n_B$ allocated RBs 400 of size $n_{sc}^{RB} \times N_{sym}^{RB}$. The total number of encoded data bits that can be transmitted by all $n_B$ RBs 400 of size $n_{sc}^{RB} \times N_{sym}^{RB}$ is:

$$n_{total\_RB\_bits} = \sum_{k=0}^{n_B-1} b_{k,Data} + \sum_{k=0}^{n_B-1} n_{k,Pilot} \quad (9)$$

To completely fill all $n_B$ allocated RBs 400 with a user's encoded bits we require that:

$$n_{total\_RB\_bits} - n_{total\_user\_bits} = 0 \quad (10)$$

To meet this requirement the $n_{total\_user\_bits}$ bits output by the Data Channel FEC Encoder 300 may be extended using $n_{pad} \geq 0$ pad bits, according to an embodiment. The Data Channel Pad-Bit Inserter 302 performs this function. The required number of pad bits is simply the difference:

$$n_{pad} = n_{total\_RB\_bits} - n_{total\_user\_bits} \quad (11)$$

The $n_{pad}$ bits may be a cyclic repetition of the first $n_{pad}$ bits of the length $n_{Data\_bits}$ codeword block, for example. This is more efficient than simple zero-padding and incurs hardly any additional complexity. Another option may be to multiplex other user's data within the unused locations, for example.

Of course, if the optional control bits were input to the OFDMA subsystem 312, Control Channel FEC Encoder 301, Control Channel Bit Interleaver 305, Control Channel RB Segmenter 307 and Control Channel Modulator 309, could be implemented with similar functionality to their Data Channel counterparts.

For equal-sized RBs 400 one design problem is specifying their dimensions in time (number of OFDMA symbols) and frequency (number of OFDMA subcarriers). Some important RB 400 design issues according to various embodiments described herein include:

RB 400 sizes should support all operating channel bandwidths;

For optimal spectral efficiency and data throughput an integer number of RBs 400 should cover or tessellate the time-frequency plane of all 802.16m subframe sizes;

RB 400 sizes should support all allowed data block sizes with minimal performance degradation and with minimal decrease in data throughput;

It is noted that large-sized RBs 400 may be better support for large data blocks and large bandwidth allocations. However, if a small data block is mapped to a large-sized RB 400 a number of RB 400 elements may not be used resulting in pad bits and a decrease in data throughput. To increase data throughput different flows for the same user may be multiplexed and share one or more large-sized RBs 400, and Small-sized RBs better may be support for small data blocks, small bandwidth allocations and power-limited cell-edge communications. However, small-sized RBs 400 may require increased overhead resulting in a decreased data throughput;

RB 400 time duration should be less than the minimum expected channel coherence time. RBs separated in time by the channel coherence time have independent fading. Minimum coherence time depends on the maximal user velocity limit for which adaptive transmission is supported. Users with high speeds or multi-path environments will cause the RB 400 size to be unnecessarily small for other users with better channel conditions;

RB 400 bandwidth should be less than the minimum expected channel coherence bandwidth. RBs 400 separated in frequency by the channel coherence bandwidth have independent fading. Minimum coherence bandwidth depends on the multi-path properties of the deployment scenario;

RB 400 sizes should minimize pilot signal overhead, configuration and control overhead (e.g. power control), and RB 400 addressing overhead; and RB 400 sizes should minimize data feedback overhead for operations such as MIMO preceding and adaptive coding and modulation. Note that these design objectives imply large-sized RBs 400.

Of course, various other design considerations, and combinations thereof, may be employed within the scope of the present disclosure.

For a single-input single-output (SISO) channel the time-variant channel impulse response $h(\tau,t)$ is by definition the channel output when the channel input is an impulse $\delta(t)$. It may be written as:

$$h(\tau, t) = \sum_{n=0}^{L-1} h_n(t)\delta(\tau - \tau_n(t)) = \sum_{n=1}^{L-1} \alpha_n(t)e^{-j2\pi f_C \tau_n(t)}\delta(\tau - \tau_n(t)) \quad (12)$$

where integer $L \geq 1$ is the finite number of resolvable propagation paths, $\tau_n(t)$ is the propagation time delay of the nth propagation path as function of time, $\alpha_n(t)$ is the gain of the nth propagation path as function of time and $f_C$ the carrier frequency.

According to certain embodiments, channel coherence time $T_C$ is a statistical measure of the time interval over which a channel's impulse response $h(\tau,t)$ is essentially invariant. It describes the similarity or correlation of $h(\tau,t)$ when sampled at different times. The definition of coherence time implies that the channel affects differently two signals arriving with a time separation greater than $T_C$. For example, given an initial time slot $t_0$ the channel coherence time $T_C$ in units of time slots is the number of time slots for which $h(\tau,t)$ and $h(\tau,t_0+T_C)$ are independent.

Fourier transforming $h(\tau,t)$ with respect to the delay variable $\tau$ gives the time-variant channel transfer function $$H(f, t) = \int_{-\infty}^{\infty} h(\tau, t)e^{-j2\pi f\tau} d\tau = \sum_{n=0}^{L-1} h_n(t)e^{-j2\pi f\tau_n} \quad (13)$$

The coherence bandwidth $B_C$ of a channel is a statistical measure of the range of frequencies over which the channel transfer function $H(f,t)$ can be considered flat (equal gain and linear phase). It describes the similarity or correlation of the time-variant transfer function $H(f,t)$ at different frequencies across a channel bandwidth. Frequency selective fading occurs when signal bandwidth is much greater than the channel coherence bandwidth. RBs 400 separated in frequency by the channel coherence bandwidth may have independent fading.

The channel's frequency correlation function may be defined as:

$$R_H(\Delta f) = \frac{E[H(f)H^*(f + \Delta f)]}{E[|H(f)|^2]} = \frac{1}{1 + (2\pi\Delta f\sigma)^2} \quad (14)$$

and the channel's time correlation function as:

$$R_H(\Delta t) = \frac{E[h(t)h^*(t + \Delta t)]}{E[|h(t)|^2]} = J_0^2(2\pi f_D \Delta t) \quad (15)$$

Here $J_0^2(2\pi f_D \Delta t)$ denotes a squared zero-order Bessel function of the first kind and $\sigma$ the channel delay spread. The Bessel function argument $f_D$=v/c denotes the maximum Doppler frequency shift, v denotes velocity and c the speed of light.

The channel coherence bandwidth $B_C$ may be calculated from the frequency correlation function $R_H(\Delta f)$, it equals the value of $\Delta f$ where the correlation $R_H(\Delta f)$ has dropped to a certain threshold. The X % channel coherence bandwidth is that value of $\Delta f$ such that:

$$R_H(\Delta f) = \frac{x}{100} \quad (16)$$

The 50% coherence bandwidth is typically approximated as:

$$B_C \frac{1}{5\sigma} \quad (17)$$

Similarly, the coherence time $T_C$ may be calculated from the temporal correlation function $R_H(\Delta t)$, it equals the value of $\Delta t$ where the correlation $R_H(\Delta t)$ has dropped to a certain threshold. The X % coherence time is that value of $\Delta t$ such that:

$$R_H(\Delta t) = \frac{x}{100} \quad (18)$$

The 50% coherence times is typically approximated as:

$$T_C \frac{9}{16\pi f_D} \quad (19)$$

Note that the channel impulse response and transfer function de-correlate for time differences $\Delta t > T_C$ and frequency differences $\Delta f > B_C$.

Table 1 contains exemplary proposed frame structure values that may be used in defining RB 400 sizes, according to an embodiment. Such frame structure values may be stored in BS memory module 218, for example.

TABLE 1

| | |
|---|---|
| Useful Symbol Time: | 80 μsec |
| Guard Interval: | 10 μsec |
| Total Symbol Time: | 90 μsec |
| # Symbols per subframe: | 6 |
| Six-Symbol Subframe Duration: | 0.54 msec |
| Subcarrier Spacing: | 12.5 kHz |

Using the maximum path delay within each table as the delay spread σ, and Equation (17), for example, the 50% coherence bandwidth estimates may be computed, as shown in Table 2.

Also shown in Table 2 is the number of 12.5 kHz subchannels that spans each estimated channel coherence bandwidth. Estimating the maximum Doppler frequency shift from $f_D$=v/c and using Equation (19), for example, the 50% coherence time estimates may be computed, as shown in Table 3. Also shown in Table 3 is the number of 90 μsec OFDMA symbols that spans each estimated channel coherence time. Such values of Table 2 and Table 3 may be stored in BS memory module 218, for example.

TABLE 2

| 802.16 m Radio Environment | Delay Spread σ (nsec) | Estimated 50% Coherence BW $B_C$ (kHz) | # of 12.5 kHz Subcarriers |
|---|---|---|---|
| Indoor Hot Spot | 215 | 930 | 75 |
| Indoor Small Office | 250 | 800 | 64 |
| Rural Macrocell | 420 | 476 | 39 |
| Outdoor to Indoor | 585 | 342 | 28 |
| Urban Microcell | 615 | 325 | 26 |
| Suburban Macrocell | 770 | 260 | 21 |
| Urban Macrocell | 1845 | 108 | 9 |
| Modified Vehicular A | 2620 | 76 | 7 |
| Bad Urban Microcell | 2800 | 71 | 6 |
| Modified Pedestrian B | 3870 | 5 | 5 |
| Bad Urban Macrocell | 7100 | 3 | 3 |

Median: 21 subcarriers (12.5 kHz)

TABLE 3

| Velocity v (kmph) | Doppler $f_D$ (Hz) | Estimated 50% Coherence Time $T_C$ (msec) | # of 90 μsec OFDM Symbols |
|---|---|---|---|
| 3 | 6.6672 | 63.466 | 706 |
| 10 | 22.224 | 19.040 | 212 |
| 20 | 44.448 | 9.520 | 106 |
| 50 | 111.12 | 3.810 | 43 |
| 100 | 222.24 | 1.904 | 22 |
| 150 | 333.36 | 1.269 | 15 |
| 200 | 444.48 | 0.952 | 11 |
| 250 | 555.6 | 0.762 | 9 |

Six 90 μsec OFDMA symbols per 0.54 msec subframe

More formally, an RB 400 is defined as an $n_{sc}^{RB}$-by-$N_{sym}^{RB}$ block matrix located within a subframe's time-frequency plane. RB 400 elements are defined as:

$$x(f_k, t_m) = \frac{1}{\sqrt{N_{FFT}}} \sum_{n=0}^{N_{FFT}-1} s(n, t_m) e^{j2\pi p_a n / N_{FFT}} \quad (20)$$

$$k = 0, 1, \ldots, n_{sc}^{RB} - 1$$

$$m = 0, 1, \ldots, N_{sym}^{RB} - 1$$

Integers $f_k$ and real-values $t_m$ respectively denote OFDMA subcarrier frequencies and OFDMA symbol start times, they are contiguous and ordered as follows:

$$f_0 < f_1 < f_2 < \ldots < f_{N_{sc}-1}^{RB} \leq N_{FFT}-1$$

$$0 \leq t_0 < t_1 < t_2 < \ldots < t_{N_{sym}^{RB}-1} \quad (21)$$

Each RB 400 element $x(f_k, t_m)$ is produced via a length-$N_{FFT}$ IFFT operation on an complex-valued symbol sequence $\{s(n, t_m)\}_{n=0}^{N_{FFT}-1}$. The product $n_{sc}^{RB} \times N_{sym}^{RB}$ equals the number of complex-valued M-QAM modulation and pilot symbols within an RB 400.

The symbol dimension $N_{sym}^{RB}$ may be fixed, but the subcarrier dimension $n_{sc}^{RB}$ may be variable. From Table 3 it is seen that the worst-case coherence time estimate is 0.762 msec and that nine 90 μsec OFDMA symbols span this time interval. From Table 1 it is seen that each subframe is comprised of six OFDMA symbols which span a time duration of 0.54 msec. Of course, these exemplary time estimates and time durations are merely provided for exemplary purposes. The worst-case coherence time estimate is greater than the number of symbols per subframe so we set the OFDMA symbol dimension $N_{sc}^{RB}=6$. The variable dimension $n_{sc}^{RB}$ is defined as:

$$n_{sc}^{RB} = m \cdot N_{sc}^{RB}, m = \frac{1}{2}, 1, 2, 4 \quad (22)$$

Of course, various different channel coherence bandwidth variations may be used, such as those associated with the 802.16m radio environments shown in Table 2. For example, a channel with coherence time of $B_C$=63.466 msec (Doppler of 6.6672 Hz) and a coherence bandwidth of $B_C$=108 kHz remains approximately constant or flat for RBs 400 with a subcarrier dimension of $n_{sc}^{RB}$=10 but not for a subcarrier dimension of $n_{sc}^{RB}$=20.

Variable m is a scaling factor that scales the subcarrier dimension $N_{sc}^{RB}$ of an $N_{sc}^{RB}$-by-$N_{sym}^{RB}$ base resource block. From Table 2 it is seen that the median coherence bandwidth estimate is 21 subcarriers. This number may be rounded to 20 and the subcarrier dimension may be set for the base RB 400 to $N_{sc}^{RB}$=20. Hence, an $N_{sc}^{RB}$-by-$N_{sym}^{RB}$ exemplary base RB 400 is comprised of $N_{sc}^{RB}$=20 subcarriers (250 kHz in frequency) and $N_{sym}^{RB}$=6 OFDMA symbols (0.54 msec in time).

Table 4 shows the number of RBs 400 per subframe as a function of channel bandwidth and the number of used subcarriers. An $N_{sc}^{RB}$-by-$N_{sym}^{RB}$ base RB 400 is comprised of $N_{sc}^{RB}$=20 subcarriers (250 kHz in frequency) and $N_{sym}^{RB}$=6 OFDMA symbols (0.54 msec in time). In order for $n_{RB}$ RBs to tessellate the used part of a subframe (guard band subcarriers and DC subcarrier are not used) the number of used subcarriers $N_{used}^{5\,MHz}$, $N_{used}^{10\,MHz}$ and $N_{used}^{10\,MHz}$ must be a multiple of $n_{sc}^{RB}$=m·$N_{sc}^{RB}$, m=½, 1, 2, 4.

TABLE 4

| Channel Bandwidth | FFT Size $N_{FFT}$ | # of Used Subcarriers $N_{used}$ (Data plus pilots only) | Number of RBs Per Subframe $n_B$ |
|---|---|---|---|
| 5 MHz | 512 | $N_{used}^{5\,MHz}$ | $N_{used}^{5\,MHz}/n_{sc}^{RB}$ |
| 10 MHz | 1024 | $N_{used}^{10\,MHz}$ | $N_{used}^{10\,MHz}/n_{sc}^{RB}$ |
| 20 MHz | 2048 | $N_{used}^{20\,MHz}$ | $N_{used}^{20\,MHz}/n_{sc}^{RB}$ |

Figure 5:
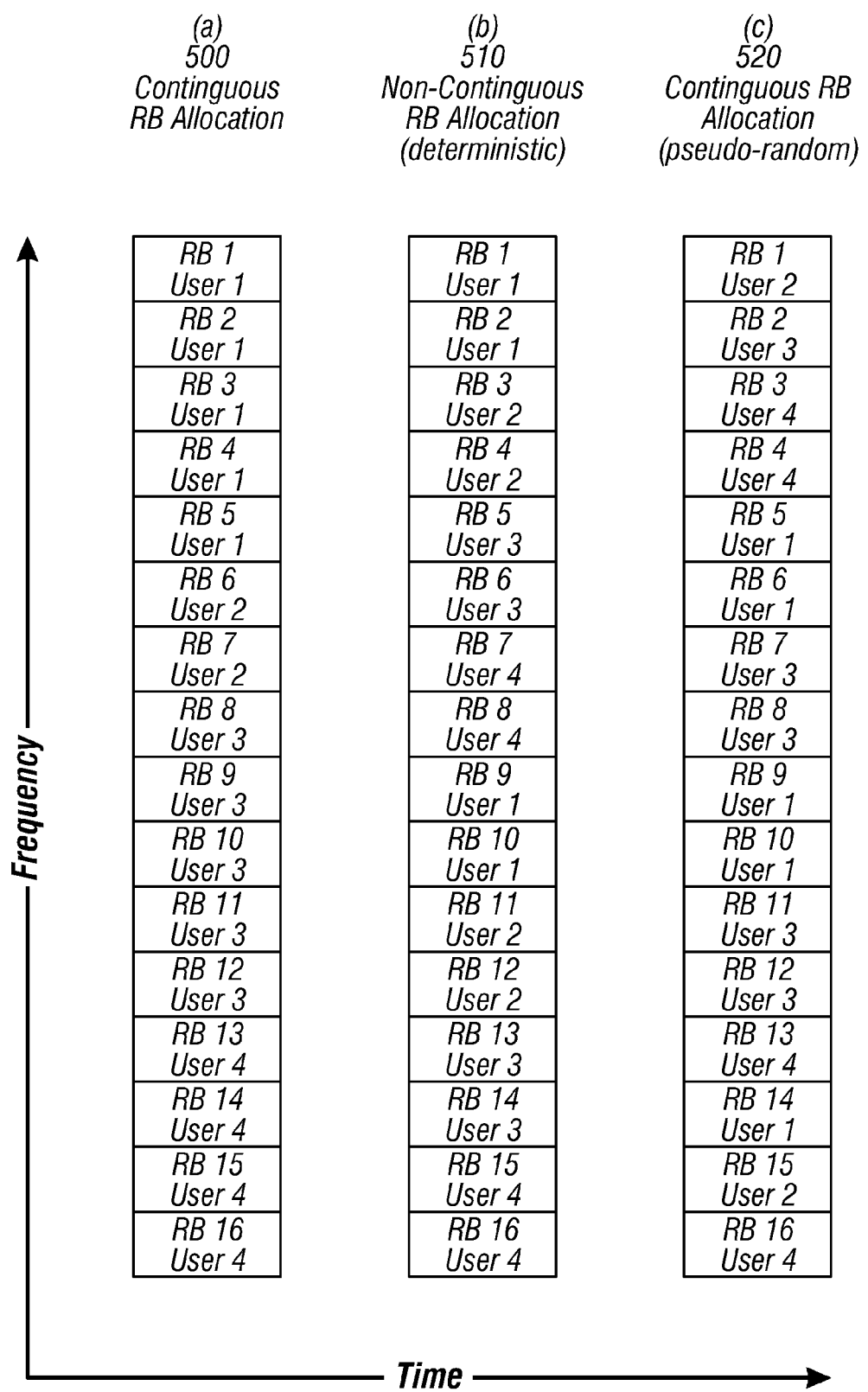
FIGS. 5(a), 5(b) and 5(c) show examples of resource block allocations, according to an embodiment.

Note 1:
Number of subcarriers per base RB 400 is $N_{sc}^{RB}$ = 20
Note 2:
Number of OFDMA symbols per base RB 400 is $N_{sym}^{RB}$ = 6
Note 3:
Number of subcarriers per RB 400 is $n_{sc}^{RB}$ = m · $N_{sc}^{RB}$, m = ½, 1, 2, 4
Note 4:
$N_{used}^{5\,MHz}$, $N_{used}^{10\,MHz}$ and $N_{used}^{10\,MHz}$ must be multiples of $n_{sc}^{RB}$ The allocation of RBs 400 to OFDMA users may be based on time-varying channel conditions. From Table 2 it is seen that a single RB 400 allocation method will not support all possible channel conditions. FIGS. 5(a), 5(b) and 5(c) show two basic RB 400 allocation methods that are proposed to address this problem, they are summarized as follows:

FIG. 5(a): Contiguous RB Allocation 500: For contiguous RB 400 allocation 500 a user's RBs 400 are allocated contiguously within an area of a subframe's time-frequency plane. Contiguous RB allocation 500 transmission is beneficial, for example, for frequency selective channels. Channel coherence bandwidth may be used for specifying a contiguous RB allocation, according to certain embodiments.

FIGS. 5(b) and (c): Non-Contiguous RB Allocation 510 and 520. Within a subframe's time-frequency plane a user's RBs 400 are spaced or distributed in subcarrier frequency. A non-contiguous RB allocation 510 and 520 may be implemented in a deterministic 510 (see FIG. 5(b)) or pseudo-random 520 manner (see FIG. 5(c)). A non-contiguous RB allocation 510 and 520 may be beneficial for the following:

(a) At a base station 102 channel quality for one or more user's mobile station 104 RBs 400 may not be known or may be inaccurate due to poor channel quality feedback or high Doppler rates, for example;

(b) Delaying critical data transmission without channel feedback reporting. For this case, data transmissions may be made more reliable by implementing frequency hopping or diversity via a non-contiguous mode, for example; and/or (c) Broadcasting and multicasting the same data to a number of users.

The number of subcarriers $n_{sc}^{RB}$ comprising an RB 400 bandwidth may either be fixed for an allocation period or it may vary adaptively as the channel changes. In the fixed case, the selected RB 400 bandwidth may be less than or equal to the smallest expected channel coherence bandwidth. In the variable or adaptive case, the RB 400 bandwidth may be selected by using estimates of the channel coherence bandwidth provided by one or more OFDMA users at one or more mobile stations 104.

TABLE 5

| Resource Block | 802.16 m Radio Environment | 50% Coherence BW $B_{C,RB_i}$ (kHz) | # of 12.5 kHz Sub-carriers | RB Size $n_{sc}^{RB} \times N_{sym}^{RB}$ |
|---|---|---|---|---|
| $RB_4^{BW}$ | Indoor Hot Spot | 930 | 75 | $4N_{sc}^{RB}$ -by- $N_{sym}^{RB}$ |
| $RB_3^{BW}$ | Indoor Small Office | 800 | 64 | $2N_{sc}^{RB}$ -by- $N_{sym}^{RB}$ |
| $RB_3^{BW}$ | Rural Macrocell | 476 | 39 | $2N_{sc}^{RB}$ -by- $N_{sym}^{RB}$ |
| $RB_2$ | Outdoor to Indoor | 342 | 28 | $N_{sc}^{RB}$ -by- $N_{sym}^{RB}$ |
| $RB_2$ | Urban Microcell | 325 | 26 | $N_{sc}^{RB}$ -by- $N_{sym}^{RB}$ |
| $RB_2$ | Suburban Macrocell | 260 | 21 | $N_{sc}^{RB}$ -by- $N_{sym}^{RB}$ |
| $RB_1$ | Urban Macrocell | 108 | 9 | $½N_{sc}^{RB}$ -by- $N_{sym}^{RB}$ |
| $RB_1$ | Modified Vehicular A | 76 | 7 | $½N_{sc}^{RB}$ -by- $N_{sym}^{RB}$ |
| $RB_1$ | Bad Urban Microcell | 71 | 6 | $½N_{sc}^{RB}$ -by- $N_{sym}^{RB}$ |
| $RB_1$ | Modified Pedestrian B | 5 | 5 | $½N_{sc}^{RB}$ -by- $N_{sym}^{RB}$ |
| $RB_1$ | Bad Urban Macrocell | 3 | 3 | $½N_{sc}^{RB}$ -by- $N_{sym}^{RB}$ |

A statistical ranking and selection algorithm may be used to adapt RB 400 bandwidth dimension $n_{sc}^{RB}$ to channel conditions. For a statistical ranking and selection algorithm we first define a candidate RB 400 set:

$$R^{BW} = \{RB_1^{BW}, RB_2^{BW}, \ldots, RB_{N_{RB}}^{BW}\} \quad (23)$$

that contains $N_{RB}$ resource blocks sizes with distinct bandwidths $n_{sc}^{RB}$. For example, various radio operating environments were used to derive the candidate set shown in Table 5. Different candidate sets may be used for different channel bandwidths, this is denoted by the superscript BW (e.g. BW=5, 10 and 20 MHz). Coherence bandwidths associated with the $N_{RB}$ resource blocks sizes in $R^{BW}$ are contained within the following set:

$$B^{BW} = \{B_{C,RB_1}, B_{C,RB_2}, \ldots, B_{C,RB_{N_{RB}}}\} \quad (24)$$

By comparing a coherence bandwidth estimate $\hat{B}_C$ with all coherence bandwidths in $B^{BW}$ a scheduler may rank or order the candidates in $B^{BW}$. This will give an RB 400 ranking such as:

$$RB_{i_1}^{BW} \prec RB_{i_2}^{BW} \prec \ldots \prec RB_{i_{N_{RB}}}^{BW} \quad (25)$$

where $\{t_1, i_2, \ldots, i_{N_{RB}}\}$ is a distinct permutation of $\{1, 2, \ldots, N_{RB}\}$. A ranking of $B^{BW}$ will be consistent with a ranking of the elements in $R^{BW}$. The scheduler then selects the number of subcarriers $n_{sc}^{RB}$ comprising the highest ranked candidate $RB_{i_1}^{BW}$ as the resource subcarrier dimension to use for an RB 400 allocation period.

Some example design considerations for specifying candidate elements within $R^{BW}$ are as follows: (1) small RB 400 sizes may require extensive signaling and overhead, (2) a lower RB bandwidth limit may be set to best support the minimal used encoded and modulated data block size, (3) the size of the RBs 400 bandwidth may be multiples of each other.

It is noted that $\hat{B}_C$ may be the smallest channel coherence bandwidth of a number of OFDMA mobile stations 104, the average coherence bandwidth of a number of mobile stations 104, or the channel coherence bandwidth of a high-priority mobile station 104. The candidate RBs 400 contained in set $R^{BW}$ may be ranked by comparing $\hat{B}_C$ with the values of coherence bandwidth set $B^{BW}$. For example, RBs 400 in $R^{BW}$ can be ranked according to an $L_p$-norm:

$$\|\hat{B}_C - \hat{B}_{C,RB}^{BW}\|_p, p=1,2,\infty \quad (26)$$

which quantifies the distance between a coherence bandwidth $\hat{B}_{C,RB_1}^{BW}$ in $B^{BW}$ and an estimated channel coherence bandwidth $\hat{B}_C$. Data may be scheduled in accordance with the selected RB 400 size $RB_1^{BW}$ (e.g., if $RB_1^{BW}$ is the highest ranked candidate) and the RB 400 size is signaled to OFDMA users from network communication module 226 of base station 102, for example.

Estimates $\hat{B}_C$ may be derived from estimates of the channel transfer function $H(f,t)$. In the OFDMA system, a receiver (e.g., a mobile station 104) samples the received signal at time intervals $T_S$, removes the cyclic prefix, and computes the FFT of a received OFDMA symbol. For the kth subcarrier a frequency-domain channel estimate $\hat{H}(k/T_S)$ can be easily computed. An unbiased sample estimate of the frequency correlation function $R_H(\Delta f)$ may then be computed as:

$$\hat{R}_H(p) = \frac{1}{N_{FFT} - p} \sum_{k=0}^{(N_{FFT}-1)-p} \hat{H}\left(\frac{k}{T_S}\right)\hat{H}\left(\frac{k+p}{T_S}\right) \quad (27)$$

$$p = 0, 1, \ldots, N_{FFT} - 1$$

where $N_{FFT}$ is the dimension of the FFT and p the subcarrier frequency offset. This estimate may be smoothed, according to certain embodiments, by applying an exponentially weighted moving average filter defined by the equation:

$$\tilde{R}_{H,n}(p) = \alpha \hat{R}_{H,n}(p) + (1-\alpha)\tilde{R}_{H,n-1}(p) \quad (28)$$

Real value $0 < \alpha \leq 1$ is a smoothing factor and n an index for the pilot symbol period. The coherence bandwidth may then be estimated by measuring the width of the smoothed frequency correlation estimate $\tilde{R}_{H,n}(p)$. Specifically, the estimated coherence bandwidth may be defined as:

$$\hat{B}_C = \frac{P_{max} + 1}{T_S} = (P_{max} + 1)\Delta f \cdot N_{FFT} \quad (29)$$

where $P_{Max}$ is the maximum value of p for which $$|\tilde{R}_{H,n}(p)| \leq \beta \tilde{R}_{H,n}(0) \quad (30)$$

Here $\beta$ a decision threshold value between 0 and 1.

Figure 6:
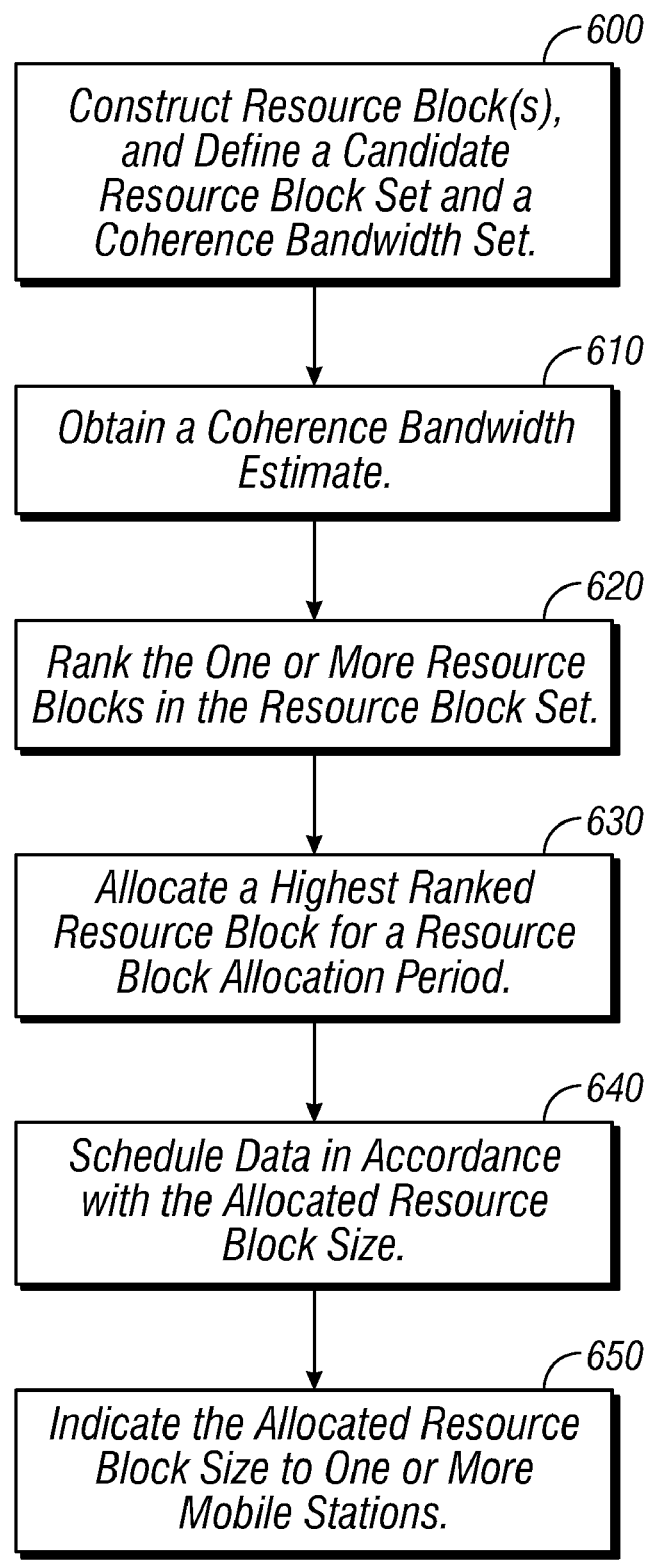
FIG. 6 is a flowchart illustrating a method for variable-sized resource block allocation in a communication system, according to an embodiment.

FIG. 6 is a flowchart illustrating a method for variable-sized resource block allocation in a communication system, according to one embodiment. Referring to FIG. 6, at step 600, a processor module 216, for example, constructs one or more RBs 400 having one or more sizes, and defines a candidate resource block set, including one or more of the constructed resource blocks, and a coherence bandwidth set, including one or more coherence bandwidths. RBs 400 are constructed by assigning a specific number of Orthogonal Frequency Division Multiple Access subcarriers to a specific number of Orthogonal Frequency Division Multiple Access symbols.

From step 600 the process continues to step 610 where a coherence bandwidth estimate is obtained. As described herein, the coherence bandwidth estimate is obtained using estimates of a channel transfer function, for example. Alternatively, the coherence bandwidth estimate is obtained using a lookup table stored in BS memory module 218, for example, depending on channel conditions associated with radio operating environments.

From step 610 the process continues to step 620 where the one or more resource blocks in the resource block set are ranked, based on a comparison between the coherence bandwidth estimate and each of the one or more coherence bandwidths in the coherence bandwidth set.

From step 620 the process continues to step 630, where the highest ranked resource block is allocated for a data transmission to a user, and (at step 640) a scheduler is configured to schedule data in accordance with a size of the allocated resource block.

According to certain embodiments, the process may include indicating the allocated resource block size to one or more mobile stations 104 in the communication system at step 650. For exemplary purposes, the allocated resource block size may be indicated to the one or more mobile stations 104 via a BS transceiver module 202 or a network communication module 226.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for variable-sized resource block allocation in a communication system, comprising:
   constructing one or more resource blocks, having one or more sizes;
   defining a candidate resource block set, including one or more of the constructed resource blocks, and defining a coherence bandwidth set, including one or more coherence bandwidths;
   deriving a coherence bandwidth estimate for a resource block subframe;
   ranking the one or more resource blocks in the resource block set, based on a comparison between the coherence bandwidth estimate and each of the one or more coherence bandwidths in the coherence bandwidth set;
   allocating a highest ranked resource block for a data transmission to a user; and
   scheduling, by a processor, data in accordance with a size of the allocated resource block.

2. The method of claim 1, further comprising:
   indicating the allocated resource block size to one or more mobile stations in the communication system.

3. The method of claim 1, wherein the highest ranked resource block is allocated for a predefined resource block allocation period.

4. The method of claim 1, wherein the constructing comprises assigning a specific number of Orthogonal Frequency Division Multiple Access subcarriers to a specific number of Orthogonal Frequency Division Multiple Access symbols.

5. The method of claim 1, wherein the one or more sizes of the one or more resource blocks are obtained from a lookup table, depending on channel conditions associated with radio operating environments.

6. The method of claim 1, wherein the coherence bandwidth estimate is obtained using estimates of a channel transfer function.

7. The method of claim 1, wherein the coherence bandwidth estimate is obtained using a lookup table, depending on channel conditions associated with radio operating environments.

8. The method of claim 1, wherein a plurality of resource blocks allocated for data transmission to a particular user are contiguous within an area of a subframe's time-frequency plane.

9. The method of claim 1, wherein a plurality of resource blocks allocated for data transmission to a particular user are distributed non-contiguously in subcarrier frequency within a subframe's time-frequency plane.

10. The method of claim 9, wherein the resource block distribution is deterministic.

11. The method of claim 9, wherein the resource block distribution is pseudo-random.

12. A system for variable-sized resource block allocation in a communication system, comprising:
a processor module configured to construct one or more resource blocks, having one or more sizes, and to define a candidate resource block set, including one or more of the constructed resource blocks, and to define a coherence bandwidth set, including one or more coherence bandwidths;
a coherence bandwidth module configured to derive a coherence bandwidth estimate for a resource block subframe;
a comparing module configured to rank the one or more resource blocks in the resource block set, based on a comparison between the coherence bandwidth estimate and each of the one or more coherence bandwidths in the coherence bandwidth set;
an allocating module configured to allocate a highest ranked resource block for a data transmission to a user; and
a scheduler configured to schedule data in accordance with a size of the allocated resource block.

13. The system of claim 12, further comprising:
a transceiver configured to indicate the allocated resource block size to one or more mobile stations in the communication system.

14. The system of claim 12, wherein the highest ranked resource block is allocated for a predefined resource block allocation period.

15. The system of claim 12, wherein the processor module is further configured to assign a specific number of Orthogonal Frequency Division Multiple Access subcarriers to a specific number of Orthogonal Frequency Division Multiple Access symbols.

16. The system of claim 12, wherein the one or more sizes of the one or more resource blocks are obtained from a lookup table, depending on channel conditions associated with radio operating environments.

17. The system of claim 12, wherein the coherence bandwidth estimate is obtained using estimates of a channel transfer function.

18. The system of claim 12, wherein the coherence bandwidth estimate is obtained using a lookup table, depending on channel conditions associated with radio operating environments.

19. The system of claim 12, wherein a plurality of resource blocks allocated for data transmission to a particular user are contiguous within an area of a subframe's time-frequency plane.

20. The system of claim 12, wherein a plurality of resource blocks allocated for data transmission to a particular user are distributed non-contiguously in subcarrier frequency within a subframe's time-frequency plane.

21. The system of claim 20, wherein the resource block distribution is deterministic.

22. The system of claim 20, wherein the resource block distribution is pseudo-random.

23. A station configured for variable-sized resource block allocation in a communication system, comprising:
means for constructing one or more resource blocks, having one or more sizes;
means for defining a candidate resource block set, including one or more of the constructed resource blocks, and defining a coherence bandwidth set, including one or more coherence bandwidths;
means for deriving a coherence bandwidth estimate for a resource block subframe;
means for ranking the one or more resource blocks in the resource block set, based on a comparison between the coherence bandwidth estimate and each of the one or more coherence bandwidths in the coherence bandwidth set;
means for allocating a highest ranked resource block for a data transmission to a user; and
means for scheduling data in accordance with a size of the allocated resource block.

24. The station of claim 23, further comprising:
means for indicating the allocated resource block size to one or more mobile stations in the communication system.

25. The station of claim 23, wherein the highest ranked resource block is allocated for a predefined resource block allocation period.

26. The station of claim 23, wherein the means for constructing comprises means for assigning a specific number of Orthogonal Frequency Division Multiple Access subcarriers to a specific number of Orthogonal Frequency Division Multiple Access symbols.

27. The station of claim 23, wherein the one or more sizes of the one or more resource blocks are obtained from a lookup table, depending on channel conditions associated with radio operating environments.

28. The station of claim 23, wherein the coherence bandwidth estimate is obtained using estimates of a channel transfer function.

29. The station of claim 23, wherein the coherence bandwidth estimate is obtained using a lookup table, depending on channel conditions associated with radio operating environments.

30. The station of claim 23, wherein a plurality of resource blocks allocated for data transmission to a particular user are contiguous within an area of a subframe's time-frequency plane.

31. The station of claim 23, wherein a plurality of resource blocks allocated for data transmission to a particular user are distributed non-contiguously in subcarrier frequency within a subframe's time-frequency plane.

32. The station of claim 31, wherein the resource block distribution is deterministic.

33. The station of claim 31, wherein the resource block distribution is pseudo-random.

34. The station of claim 23, wherein the station is a base station.

35. A non-transitory computer-readable medium storing instructions thereon for, when executed by a processor, performing a method for variable-sized resource block allocation in a communication system, the method comprising:

constructing one or more resource blocks, having one or more sizes;

defining a candidate resource block set, including one or more of the constructed resource blocks, and defining a coherence bandwidth set, including one or more coherence bandwidths;

deriving a coherence bandwidth estimate for a resource block subframe;

ranking the one or more resource blocks in the resource block set, based on a comparison between the coherence bandwidth estimate and each of the one or more coherence bandwidths in the coherence bandwidth set;

allocating a highest ranked resource block for a data transmission to a user; and scheduling data in accordance with a size of the allocated resource block.

36. The computer-readable medium of claim 35, further comprising:

indicating the allocated resource block size to one or more mobile stations in the communication system.

37. The computer-readable medium of claim 35, wherein the highest ranked resource block is allocated for a predefined resource block allocation period.

38. The computer-readable medium of claim 35, wherein the constructing comprises assigning a specific number of Orthogonal Frequency Division Multiple Access subcarriers to a specific number of Orthogonal Frequency Division Multiple Access symbols.

39. The computer-readable medium of claim 35, wherein the one or more sizes of the one or more resource blocks are obtained from a lookup table, depending on channel conditions associated with radio operating environments.

40. The computer-readable medium of claim 35, wherein the coherence bandwidth estimate is obtained using estimates of a channel transfer function.

41. The computer-readable medium of claim 35, wherein the coherence bandwidth estimate is obtained using a lookup table, depending on channel conditions associated with radio operating environments.

42. The computer-readable medium of claim 35, wherein a plurality of resource blocks allocated for data transmission to a particular user are contiguous within an area of a subframe's time-frequency plane.

43. The computer-readable medium of claim 35, wherein a plurality of resource blocks allocated for data transmission to a particular user are distributed non-contiguously in subcarrier frequency within a subframe's time-frequency plane.

44. The computer-readable medium of claim 43, wherein the resource block distribution is deterministic.

45. The computer-readable medium of claim 43, wherein the resource block distribution is pseudo-random.

* * * * *